April 3, 1945.   F. C. SUTLIFFE ET AL   2,372,864
PRESSURE GAUGE
Original Filed June 19, 1940   2 Sheets-Sheet 2

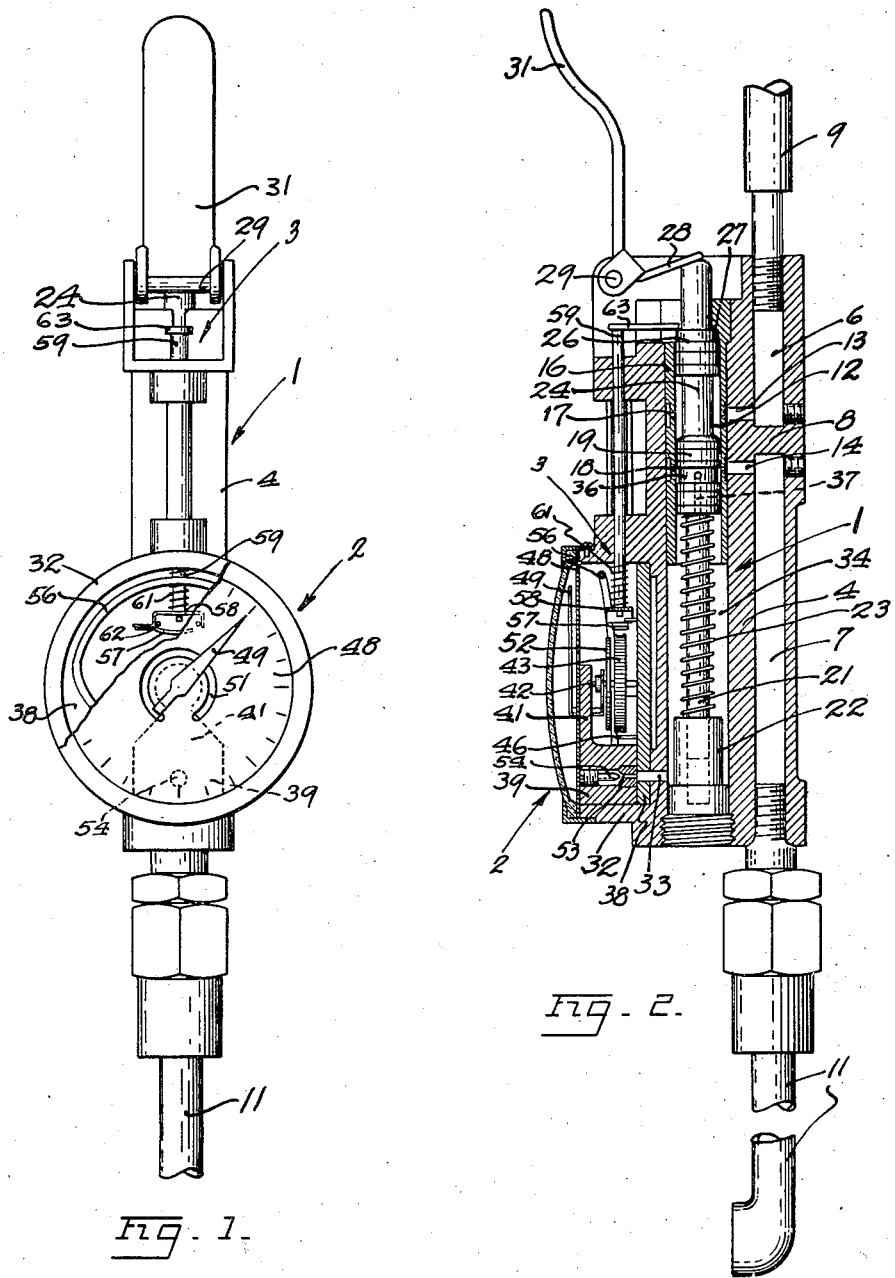

INVENTORS
FRANK C. SUTLIFFE
ROY ASHLEY
BY George B. White
ATTORNEY.

Patented Apr. 3, 1945

2,372,864

UNITED STATES PATENT OFFICE 2,372,864

PRESSURE GAUGE

Frank C. Sutliffe, Mill Valley, and Roy Ashley, Almonte, Calif., assignors to Air Balance Instrument Co., San Francisco, Calif.

Original application June 19, 1940, Serial No. 341,300. Divided and this application July 17, 1943, Serial No. 495,396

4 Claims. (Cl. 73—388)

This invention relates to a gauge and is a division of our application for valve and gauge, Serial No. 341,300, filed June 19, 1940.

An object of this invention is to provide a gauge of the bridle turbine type wherein the fluid is applied to the periphery of the rotor in an efficient manner to accurately indicate fluid pressure.

Another object of the invention is to provide a guage of the bridle turbine type wherein the fluid is conducted to the nozzle orifice from an intake orifice so calibrated as to maintain an undisturbed head behind the jet issuing from the nozzle against the rotor periphery.

We are aware that some changes may be made in the general arrangements and combinations of the several devices and parts, as well as in the details of the construction thereof without departing from the scope of the present invention as set forth in the following specification, and as defined in the following claims; hence we do not limit our invention to the exact arrangements and combinations of the said device and parts as described in the said specification, nor do we confine ourselves to the exact details of the construction of the said parts as illustrated in the accompanying drawings.

With the foregoing and other objects in view, which will be made manifest in the foregoing detailed description, reference is had to the accompanying drawings for the illustrative embodiment of the invention, wherein:

Fig. 1 is a face view of the gauge and its valve control.

Fig. 2 is a sectional view of the gauge and its valve control showing the valve closed.

Figure 3:
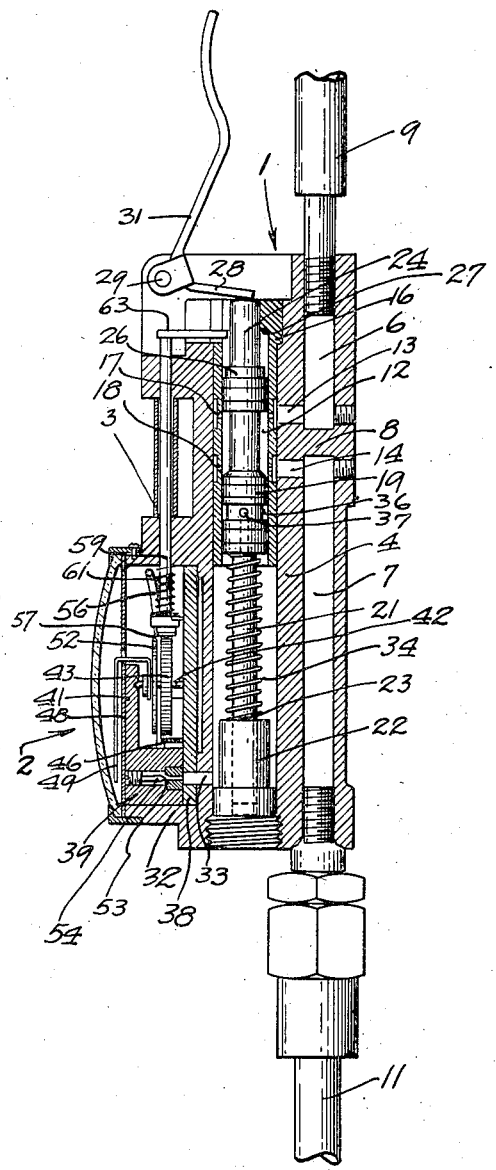
Fig. 3 is a sectional view of the gauge showing the control valve open and the gauge rotor stopped in its previous indicating position.
Figure 4:
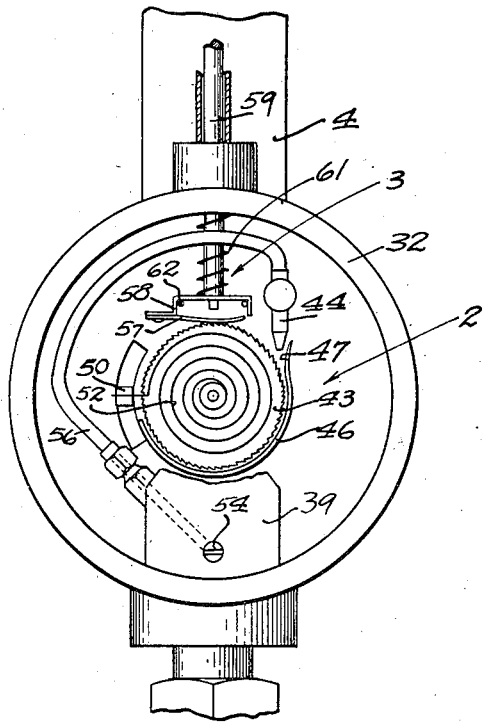
Fig. 4 is a fragmental front view of the gauge, the face or dial being removed to expose the moving parts in stopped position.

In its general organization our device includes a valve mechanism 1, a gauge 2 connected to the valve mechanism 1 so as to indicate the pressure at one of the valve passages, and a brake mechanism 3 for co-ordinating the action of the valve mechanism 1 and of the gauge 2 so that when the valve mechanism 1 is operated to communicate the valve passages, the gauge is stopped in that reading position which it assumed immediately preceding the valve opening.

The valve mechanism 1 has a valve body 4 with two passages 6 and 7 separated by a transverse wall 8. When the device is used as a tire inflating valve and gauge, then the passage 6 at one end is the intake passage connected to a supply conduit 9, and the other passage 7 is the outlet or delivery passage and it is connected to a suitable delivery line 11 to fit over the usual tire in a suitable manner. Communication between the intake passage 6 and the delivery passage 7 is established through a valve chamber 12. This valve chamber 12 in the herein illustration is cylindrical and it is arranged parallel with the substantially coaxial valve passages 6 and 7. Holes 13 and 14 extend respectively from the valve passages 6 and 7 toward the valve chamber 12. A lining sleeve 16 of the valve chamber 12 has spaced annular ports 17 and 18 communicating with the holes 13 and 14 respectively.

In this illustrative embodiment we make use of a piston valve 19 for controlling the flow between the valve ports 17 and 18. When the piston valve 19 is located between the spaced ports 17 and 18, then the valve is closed as shown in Figure 2. When the valve 19 is moved past both ports 17 and 18 as shown in Fig. 3, then the valve is open and flow is permitted through the valve chamber 12 from the intake port 17 to the delivery port 18. A valve stem 21 extends from the piston valve 19 and is slidably guided in a plug 22 in the end of the valve body 4 adjacent the delivery conduit 11. A coil spring 23 around the valve stem 21 normally urges the piston valve 19 into the closing position shown in Fig. 2. Another stem 24 extends from the piston valve 19 beyond the intake end of the valve body 4 and has thereon a packing collar 26 which latter abuts against a shoulder 27 of the chamber lining sleeve 16 so as to limit the valve travel in that direction.

The valve mechanism is operated by a lever arm 28 which bears against the outside end of the stem 24. This lever arm 28 is fulcrumed at 29 on the valve body 4 and has a handle 31 extended at a suitable angle for easy manipulation. When the handle 31 is pressed toward the intake conduit 9 the lever 28 presses on the stem 24 and moves the valve piston 19 against the action of the spring 23 past port 18 into the valve opening position shown in Fig. 3. When the handle 31 is released then the action of the spring 23 returns the valve piston 19 to its valve closing position between the ports 17 and 18 as shown in Fig. 2.

Our gauge 2 is shown in the herein illustration as a unitary structure with a valve mechanism 1. A cup-shaped substantially cylindrical casing 32 is formed on the outside of the valve body 4. This casing 32 accommodates a gauge mechanism therein. Fluid or air from the valve mechanism 1 is by-passed to the gauge 2 through the valve 19 and through an opening 33 in the extended end portion 34 of the chamber 12 connecting through the bottom of the casing 32. The valve 19 has an annular by-pass recess 36 on its periphery so located that when the valve 19 is in the valve closing position, shown in Fig. 2, the by-pass recess 36 is in registry with the delivery port 18 of the valve sleeve 16. A comparatively small by-pass hole 37 extends from the bottom of the by-pass recess 36 to the end of the piston valve 19 adjacent the spring 23. The by-pass hole 37 is of such size that the chamber portion 34 below the valve 19 is filled gradually to the static pressure in the passage 7. Thus fluid or air is by-passed from the delivery passage 7 through the delivery port 18 of the valve chamber 12 into the by-pass recess 36 and then through the by-pass hole 37 in the valve 19 into the valve chamber extension 34 and out through the opening 33 into the gauge 2. Whenever the valve 19 is in valve closing position, the pressure on the delivery side of the passage is communicated to the gauge 2 and a reading thereof can be taken in the usual manner. It is to be understood however that by interchanging the functions of the intake and delivery passages, or by reversing the operating stroke of the piston valve 19 this measurement could be taken from the intake side of the valve 19 if measurement of the change of pressure at the intake side is desired. In using this device for controlling the inflating of tires the measurement is taken from the delivery side of the valve, namely, from the tire, so that the pressure in the tire can be gauged intermittently during the inflating operation.

Our gauge 2 includes a base plate 38 on the bottom of the casing 32 which has a bridge block 39 on one side thereof. A portion 41 protrudes from the bridge block 39 over opposite the center of the base plate 38. A spindle 42 is suitably journaled in the base plate 38 and in the bridge portion 41. A rotor 43 is supported on the spindle 42 for rotation therewith. The rotor 43 preferably has a concave and serrated periphery as shown. The rotor 43 is rotated by a jet of fluid directed against its serrated periphery from a nozzle 44. An arcuate shield or shroud 46 adjacent a segment of the periphery of the rotor 43 confines the flow to the rotor periphery over a definite arc. The inlet end 47 of the shroud 46 is flared away from the wheel periphery so as to form a Venturi throat into which the jet is directed from the nozzle 44. A dial 48 is secured on top of the bridge block 39, and an indicator hand 49 secured to the spindle 42 extends through a slot 51 in the dial 48 and is extended horizontally into indicating position over the face of the dial 48. The rotor 43 is controlled by a hair spring 52 which is anchored to a post 50.

In order to accurately calibrate the flow through the nozzle 44 so that the resulting gauge reading is proportional to the static head of the fluid measured, we provide an adjustable inlet orifice. In this form the fluid is conducted from the opening 33 to an orifice 53 controlled by a needle valve 54 in the bridge block 39, and then through a comparatively long and narrow tube 56 to the nozzle 44. The ratio between the inlet orifice 53 and the orifice of the nozzle 44 is calibrated by adjusting the needle valve 54 so that the force exerted on the rotor 43 causes an indication corresponding to the static head of the fluid measured. In other words, the static head at the valve mechanism 1 is converted into a calibrated flow acting against the spring balanced rotor so as to indicate accurately the pressure of the static head. The comparatively long tube 56 assures the maintenance of a calibrated head between the needle valve orifice 53 and the nozzle 44. This calibration is performed by first adjusting the spring of the rotor, the nozzle and shroud so as to obtain linear pressure scale in proportion to the force of the jet. Then the gauge is connected to a source of fluid having the maximum static head to which the gauge is proposed to be subjected. For instance, if the gauge scale is from 0 to 120 pounds pressure, then the gauge is calibrated on a predetermined 120 pounds static head. If the hand 49 of the gauge 2 under this predetermined pressure is not pointing at 120 on the scale of the dial 48, then the needle valve 54 is adjusted so as to restrict or enlarge the inlet orifice 53, until the flow through the nozzle 44 is such as to hold the hand 49 in a position reading on the indication 120, corresponding to said predetermined maximum static head. The remaining readings will be linear and therefore the gauge 2, although operated by a jet, will give accurate readings of the static head of the fluid measured.

The brake mechanism 3 in the herein illustrative embodiment, includes a resilient curved brake shoe 57 mounted at one end thereof on a frame 58, so that the convex side of the brake shoe 57 is adjacent to the periphery of the rotor 43. A shaft 59 extends from the frame 58 through the wall of the casing 32 substantially parallel with the valve travel of the piston valve 19. A coil spring 61 between the brake shoe frame 58 and the wall of the casing 32 normally urges the frame 58 and the brake shoe 57 against the periphery of the rotor 43. The stroke of this brake movement is limited by a pair of abutment pins 62 on the base plate 38 against which the brake shoe frame 58 abuts at the end of its brake applying stroke. The free end of the brake shaft 59 extends to a point adjacent the valve actuating lever 28 and it has an arm 63 extended over and through the open side at the top of the valve chamber sleeve 16 so as to be in the path of the top of the packing collar 26. The relative arrangement is such that when the valve is in closed position as shown in Fig. 2, the packing collar 26 pushes the brake arm 53 so as to move and hold the brake shaft 59 and the brake shoe 57 away from the rotor 43. Hence whenever the valve is closed the brake shoe 57 is held out of contact with the rotor 43. This allows the rotation of the rotor 43 by fluid introduced through the by-pass hole 37 of the valve 19. Whenever the valve is opened and the packing collar 26 is moved away from the brake shaft arm 63, the action of the brake spring 61 is allowed to apply the brake shoe 57 for stopping the rotor 43 and the indicator hand 49 in the position in which they were at the moment when the valve was opened.

In operation the device herein can be easily manipulated. For instance, in inflating pneumatic tires, the delivery line 11 is connected to the tire valve in the usual manner and the air pressure is immediately, yet gradually, by-passed through the valve 19 to the gauge 2 and the tire pressure can be read on said gauge 2. Then by depressing the actuating handle 31 the valve mechanism 1 is opened and simultaneously the brake mechanism 3 is applied to stop the gauge reading at the instant tire pressure. While the valve is open air flows through the valve chamber 12 from the supply line 9 to the delivery line 11. During this operation the handle 31 may be intermittently released so as to momentarily stop the inflating. When the handle 31 is released the valve spring 23 moves the valve 19 into closed position and the packing collar 26 disengages the brake shoe 57 from the rotor 43 substantially simultaneously with the closing of the valve. The air by-passed from the tire through the delivery line 11 moves the gauge indication progressively from its next previous indication to a position indicating the changed tire pressure. This operation can be repeated frequently during an inflating operation, and successive gauge readings can be taken intermittently without returning the gauge indicator element to an initial starting point before each reading. Thus, sensitive, accurate and speedier measurement is assured without substantial interruption of the filling operation through the valve.

We claim:

1. In a fluid gauge of the bridle turbine type, the combination with the resiliently controlled rotor of the gauge and a jet orifice discharging against the rotor to cause a turning moment thereof; of an inlet orifice circumferentially spaced from said jet orifice with respect to the rotor, and a conduit leading from the inlet orifice to the jet orifice, the ratio between the size of the inlet orifice and jet orifice being such that the head in said conduit causes a jet force for a turning moment of the rotor to indicate on the gauge the static head of the medium outside of said inlet orifice.

2. In a fluid gauge of the bridle turbine type, the combination with the resiliently controlled rotor of the gauge and a jet orifice discharging against the rotor to cause a turning moment thereof; of an inlet orifice, an elongated conduit between the inlet orifice and the jet orifice, the ratio between the size of the inlet orifice and the jet orifice being such that the head in said conduit causes a jet force for a turning moment of the rotor to indicate on the gauge the static head of the medium outside of said inlet orifice, and means to adjust said inlet orifice to calibrate the pressure head behind the jet.

3. In a gauge of the bridled turbine type, the combination with the resiliently balanced rotor of the gauge and a nozzle directing a jet against the rotor periphery to exert turning moment for indication on the gauge; of an inlet orifice spaced from the nozzle circumferentially with respect to the rotor, a conduit connecting the inlet orifice to the nozzle, means to adjust the opening of the inlet orifice, and a plurality of serrations on the rotor periphery, the rotor periphery being concave to form an annular channel around the rotor.

4. In a gauge of the character described, a spring balanced rotor, an element connected to the shaft of the rotor for gauge indication, a shield partially surrounding the periphery of said rotor, a nozzle directing a jet into the space between the shield and the rotor periphery, an elongated conduit leading to said nozzle, an intake block at the intake end of the conduit, and an adjustable valve to control the intake to said conduit so as to maintain a substantially static head in the conduit.

FRANK C. SUTLIFFE.
ROY ASHLEY.